United States Patent [19]
Peroni

[11] Patent Number: 5,632,577
[45] Date of Patent: May 27, 1997

[54] DRILL FOR DRILLING RAILS AND TRACK RIGS FOR RAILROAD APPLICATIONS

[75] Inventor: Ennio Peroni, Flero, Italy

[73] Assignee: Cembre S.p.A., Brescia

[21] Appl. No.: 538,429

[22] Filed: Oct. 2, 1995

Related U.S. Application Data

[63] Continuation-in-part of Ser. No. 300,225, Sep. 6, 1994, abandoned.

[30] Foreign Application Priority Data

Sep. 21, 1993 [IT] Italy ................... MI93A2026

[51] Int. Cl.$^6$ ................................................ B23B 41/00
[52] U.S. Cl. ................. 408/57; 408/68; 408/99; 408/103
[58] Field of Search ................. 408/56, 57, 68, 408/87, 95, 99, 100, 103, 110, 111, 124, 135, 136, 141, 78

[56] References Cited

U.S. PATENT DOCUMENTS

| | | | |
|---|---|---|---|
| 1,178,567 | 4/1916 | Wuerpel | 408/78 |
| 1,408,872 | 3/1922 | Everett . | |
| 1,421,194 | 6/1922 | Everett | 408/78 |
| 1,671,575 | 5/1928 | Everett | 408/78 |
| 1,695,062 | 12/1928 | Rostron | 408/78 |
| 1,731,010 | 10/1929 | Krause et al. | 408/68 |
| 1,745,779 | 2/1930 | Carson et al. | 408/68 |
| 2,283,722 | 5/1942 | Chandler | 408/99 |
| 3,899,264 | 8/1975 | Tobias | 408/68 |
| 4,753,556 | 6/1988 | Solko . | |

FOREIGN PATENT DOCUMENTS

| | | | |
|---|---|---|---|
| 402846 | 10/1909 | France | 408/78 |
| 543962 | 9/1922 | France | 408/99 |
| 598813 | 12/1925 | France . | |
| 2668405 | 4/1992 | France . | |

*Primary Examiner*—Daniel W. Howell
*Attorney, Agent, or Firm*—Guido Modiano; Albert Josif

[57] ABSTRACT

Drill for drilling rails and track rigs, in railroad applications, including a body which supports a motor driving a drilling tool through a reduction unit. Elements are provided for the translatory motion of the drilling tool with respect to the body. There are also elements for removably fixing the body with respect to the element to be drilled.

32 Claims, 7 Drawing Sheets

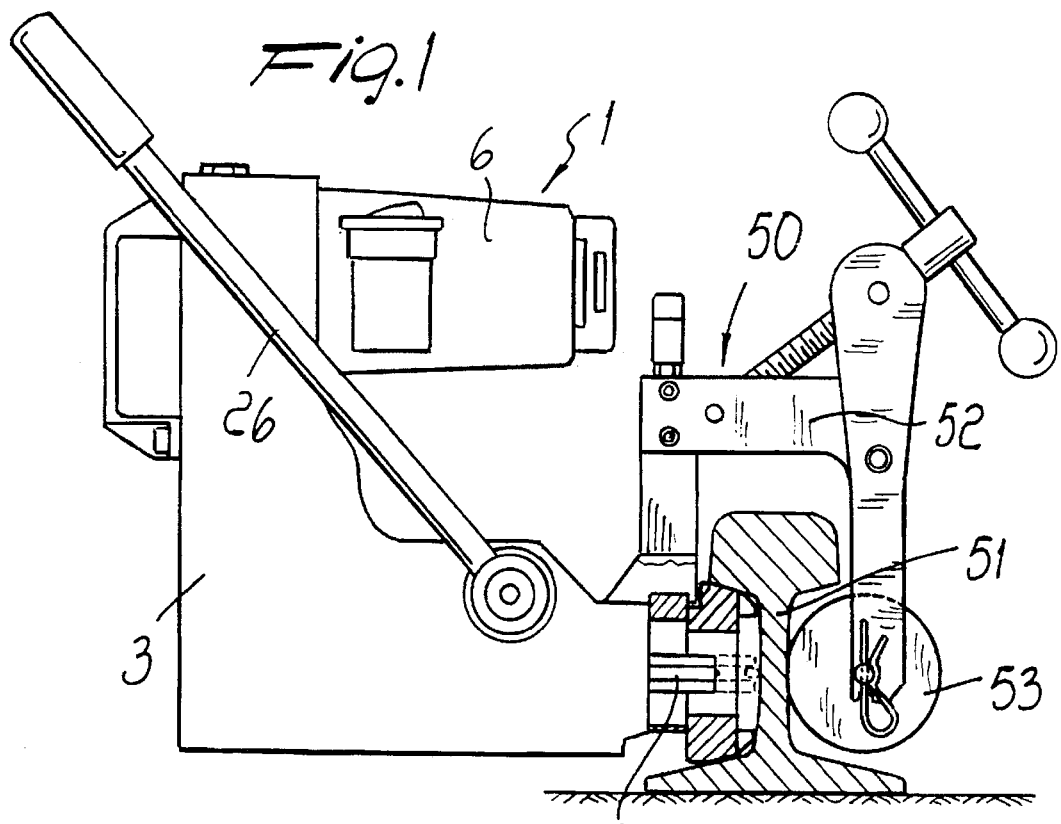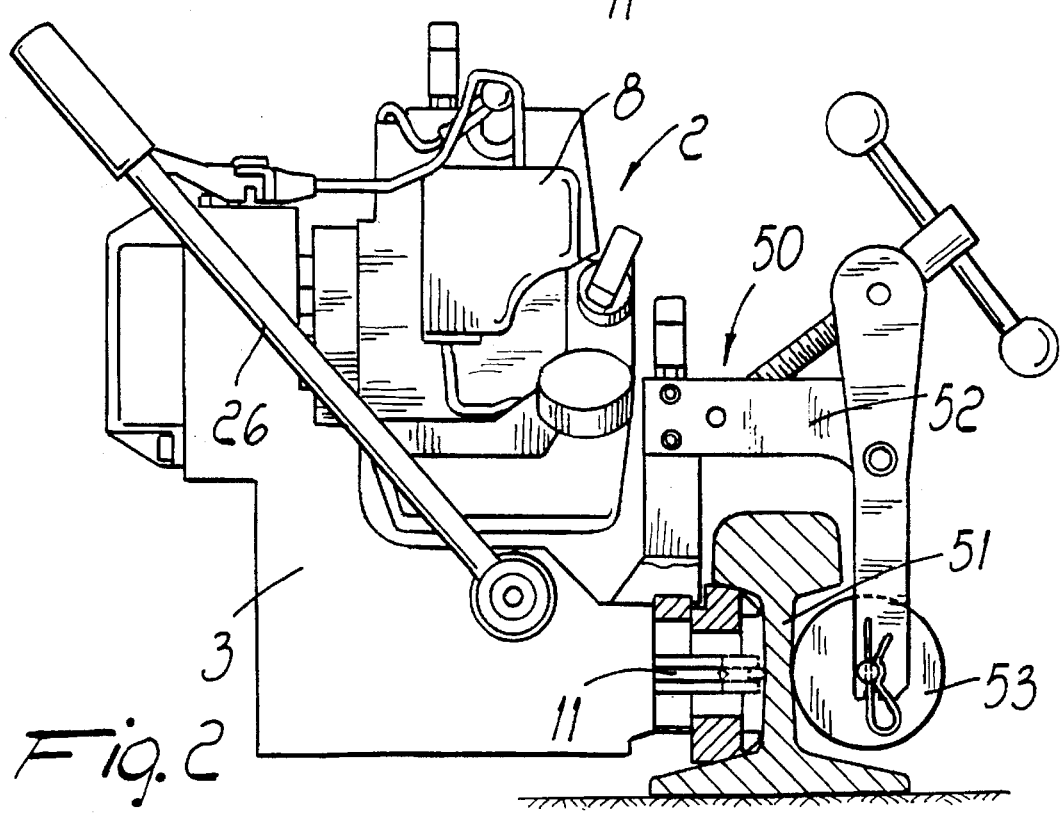

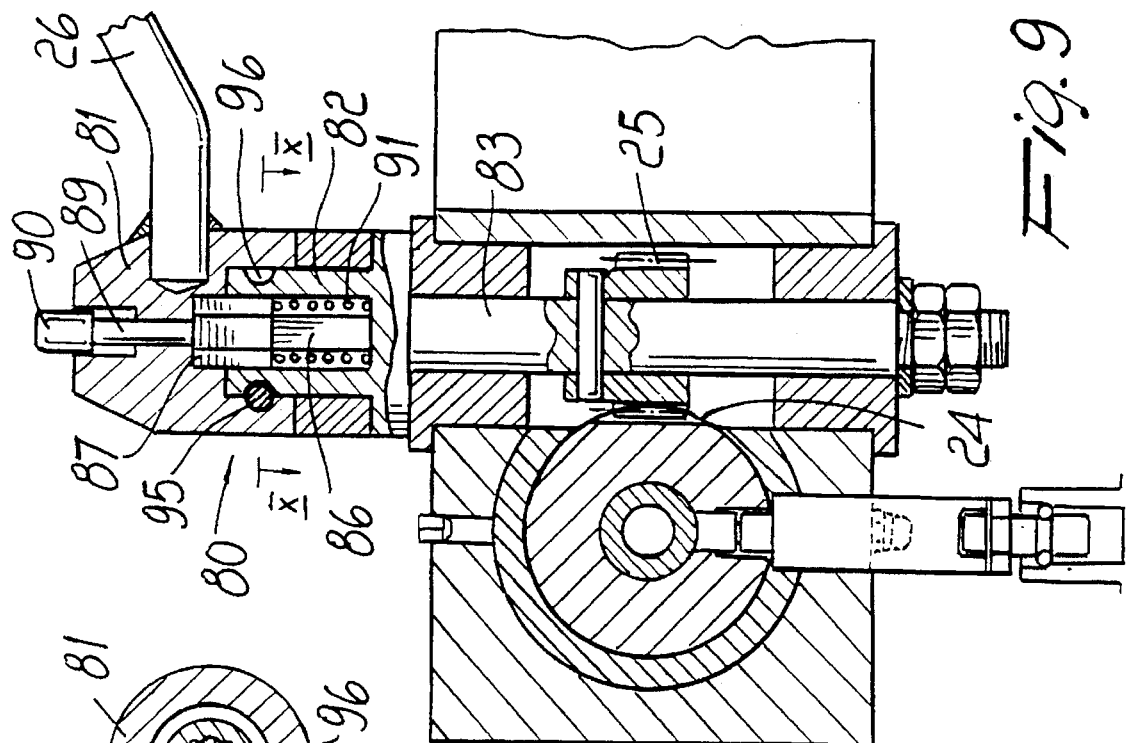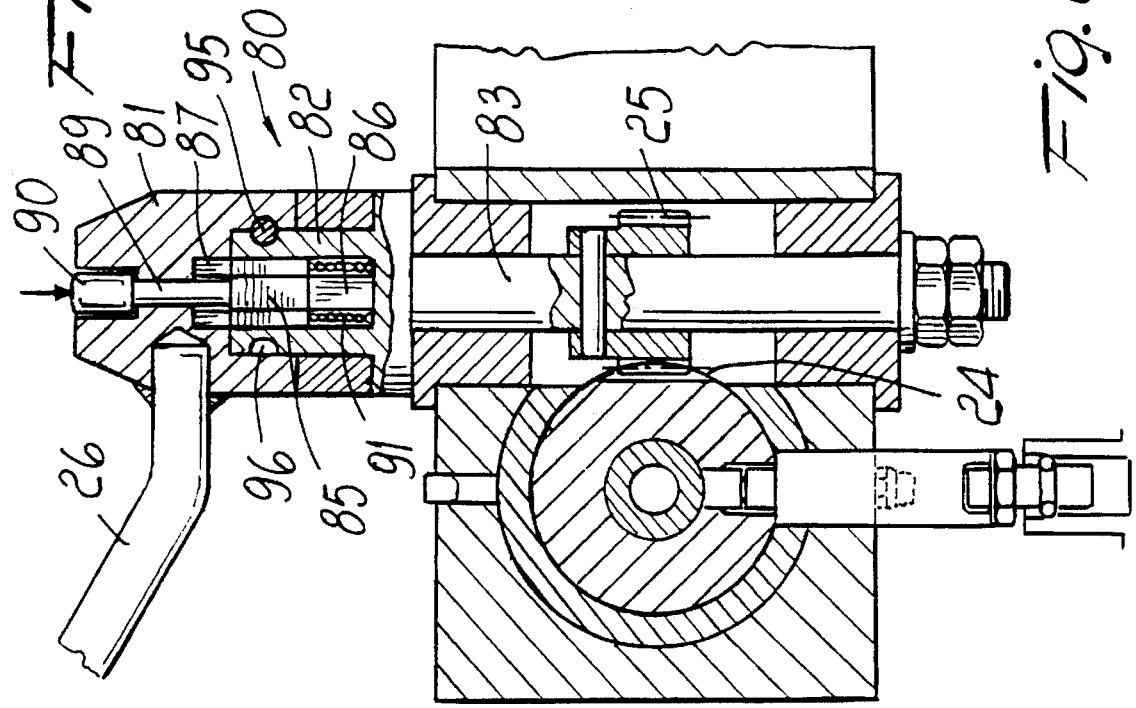

5,632,577

DRILL FOR DRILLING RAILS AND TRACK RIGS FOR RAILROAD APPLICATIONS

This application is a continuation-in-part of application Ser. No. 08/300,225 filed Sep. 6, 1994, now abandoned.

BACKGROUND OF THE INVENTION

The present invention relates to a drill for drilling rails and track rigs for railroad applications.

It is known that drilling devices adapted specifically for use on track rails are currently commercially available.

Such devices, which have particular constructive characteristics, have rather considerable dimensions and weights which often cause great difficulties in use.

Such devices generally have an electric motor or an internal-combustion engine which is mounted coaxially with the drill or milling cutter and which advances rigidly with the drill.

This type of structure, with the motor mounted so that it is axially aligned with the drilling tool and lies along its extension, entails a considerable longitudinal dimension which often is not compatible with the space available in some points of the track, such as rail switches and the like.

To the aforesaid it should be added the fact that in versions with an internal-combustion engine the exhaust of the combustion gases of the engine is often directed towards the operator, who consequently finds himself working in a toxic environment.

Such devices, as previously mentioned, are generally very heavy, and therefore movement is difficult; furthermore, in most cases they cannot be used by a single operator.

Conventional devices are generally predisposed only to execute holes horizontally, i.e. a hole whose axis is perpendicular to the stem of the rail, whereas in railroad applications it is often necessary to execute holes vertically, for example in the slabs supporting the boxes for the electrical actuation of rail switches; in this case it is necessary to use different devices, as it is not possible to modify the conventional drill adapted only to make horizontal holes.

SUMMARY OF THE INVENTION

A principal aim of the present invention is to eliminate the above mentioned drawbacks by providing a drill for drilling rails and track rigs for railroad applications which is structured so as to allow to work both horizontally and vertically and in all the positions occurring in the field of railroads.

Within the scope of the above mentioned aim, a particular object of the invention is to provide a drill which is very compact and handy and can consequently be used even in narrow spaces, such as are typically available at rail switches.

Another object of the present invention is to provide a drill which has a considerably reduced weight with respect to conventional devices, so that it can be used in all the circumstances which occur in railroad systems and can be easily carried even by a single operator.

Another object of the present invention is to provide a drill which is particularly versatile and practical in use and furthermore gives the greatest assurances of reliability and safety.

A further object of the present invention is to provide a drill for drilling rails and track rigs, in railroad applications, which can be easily obtained starting from commonly commercially available elements and materials and is advantageous from a purely economical point of view.

With this aim, the objects mentioned and others which will become apparent hereinafter in view, there is provided a drill for drilling rails and track rigs, in railroad applications, comprising a body which supports a motor that drives a drilling tool through a reduction unit, in which the drill is characterized in that it comprises means for the translatory motion of said drilling tool with respect to said body. Means are furthermore provided for the removable fixing of said body with respect to the element to be drilled.

BRIEF DESCRIPTION OF THE DRAWINGS

The characteristics and advantages of the drill for drilling rails and track rigs in railroad applications according to the present invention will become apparent from the following detailed description of preferred but not exclusive embodiment thereof, illustrated only by way of non-limitative example in the accompanying drawings, wherein:

FIG. 1 is a schematic elevation view of a drill according to the invention, driven by an electric motor;

FIG. 2 is an elevation view of a drill according to the invention driven by an internal-combustion engine;

FIG. 8 is a sectional view of the detail of the connection of the actuation lever of the means for the translatory motion of the tool shown in released position;

FIG. 9 illustrates the connection of the actuation lever of the means for translatory motion in locked position;

FIG. 10 is a sectional view, taken along the plane X—X of FIG. 9;

DESCRIPTION OF THE PREFERRED EMBODIMENTS

Figure 3:
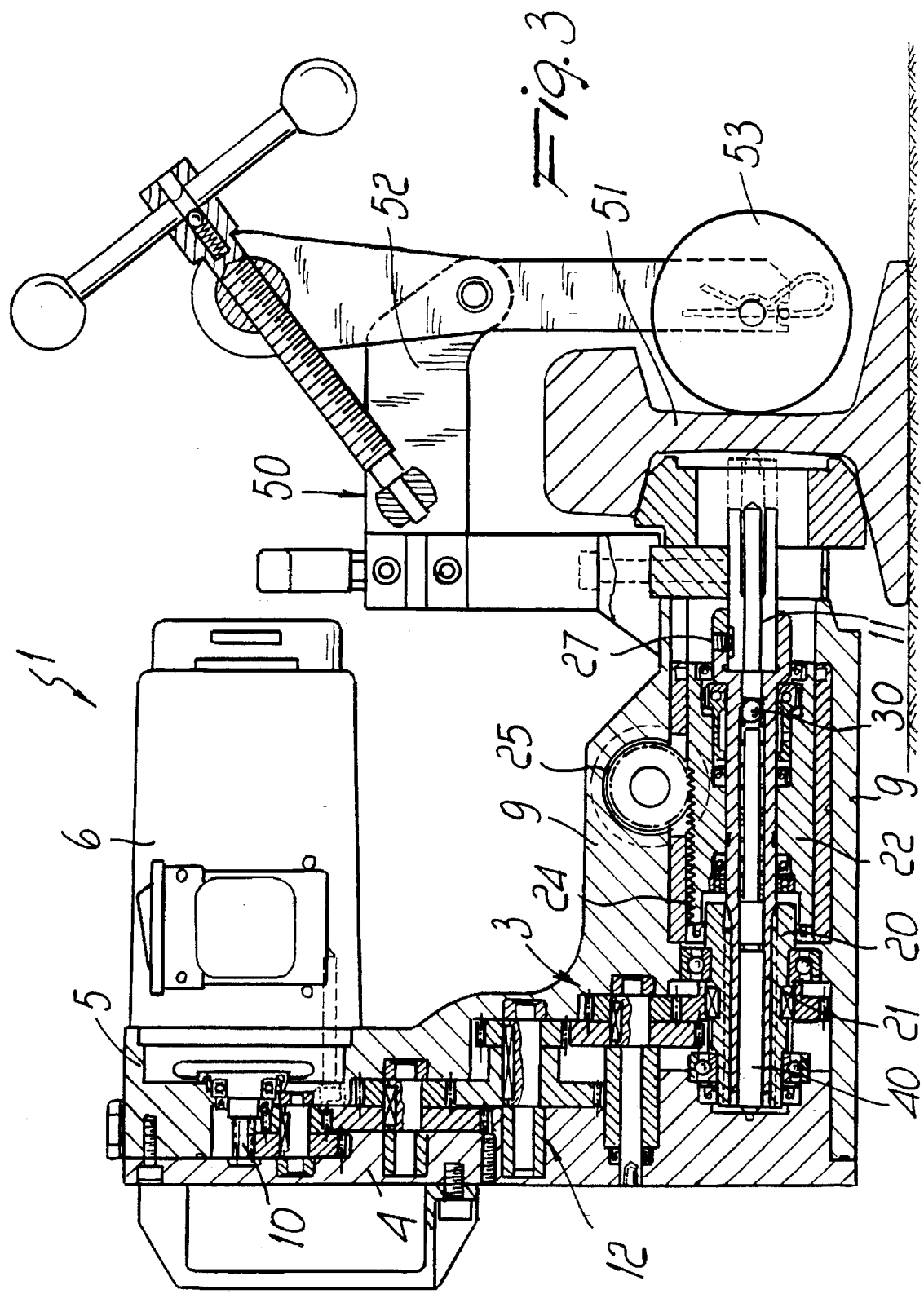
FIG. 3 is a sectional view of the drill with the electric motor applied to the web of the rail.
Figure 4:
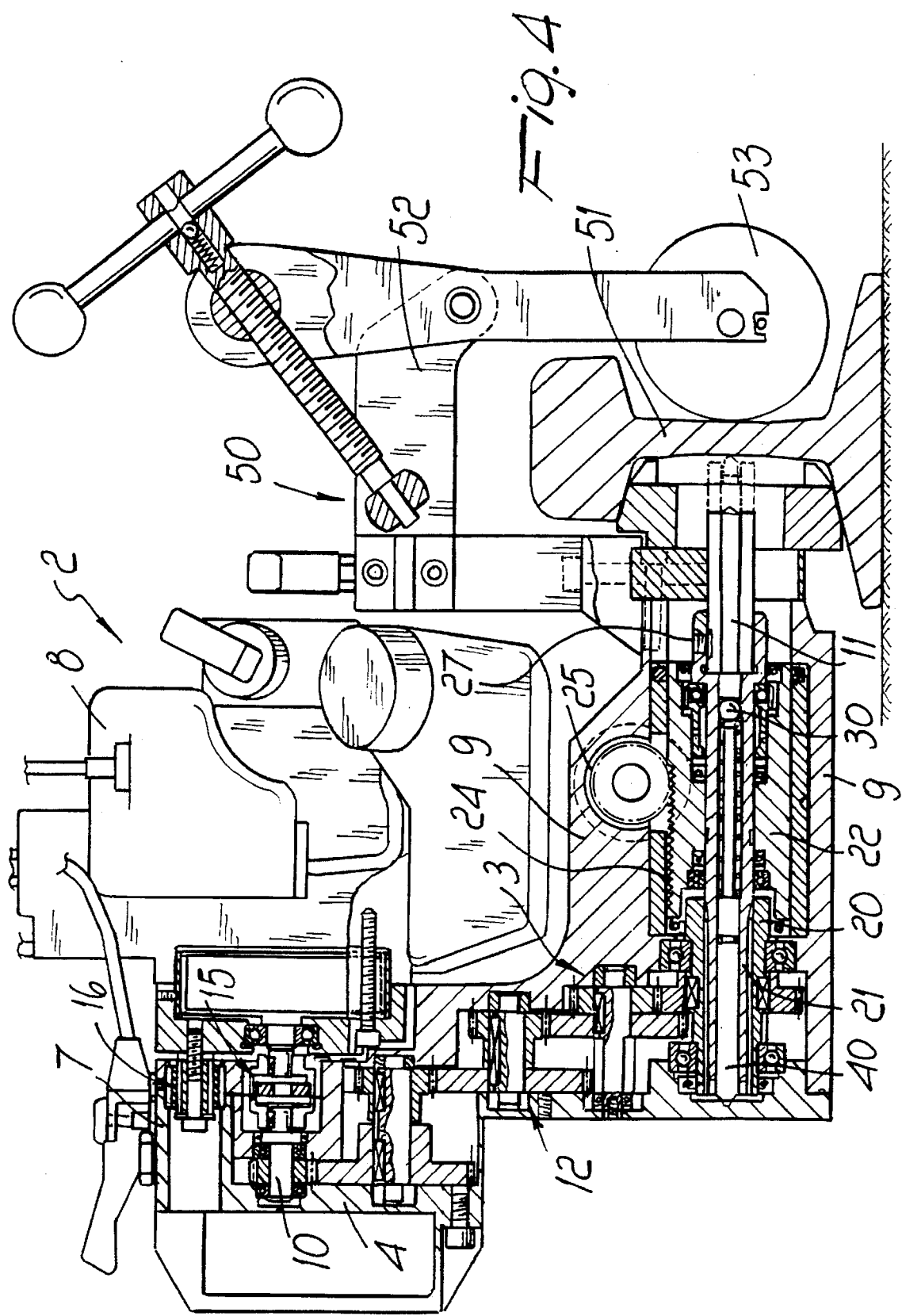
FIG. 4 is a sectional view of the drill with the internal-combustion engine applied to the web of the rail.
Figure 5:
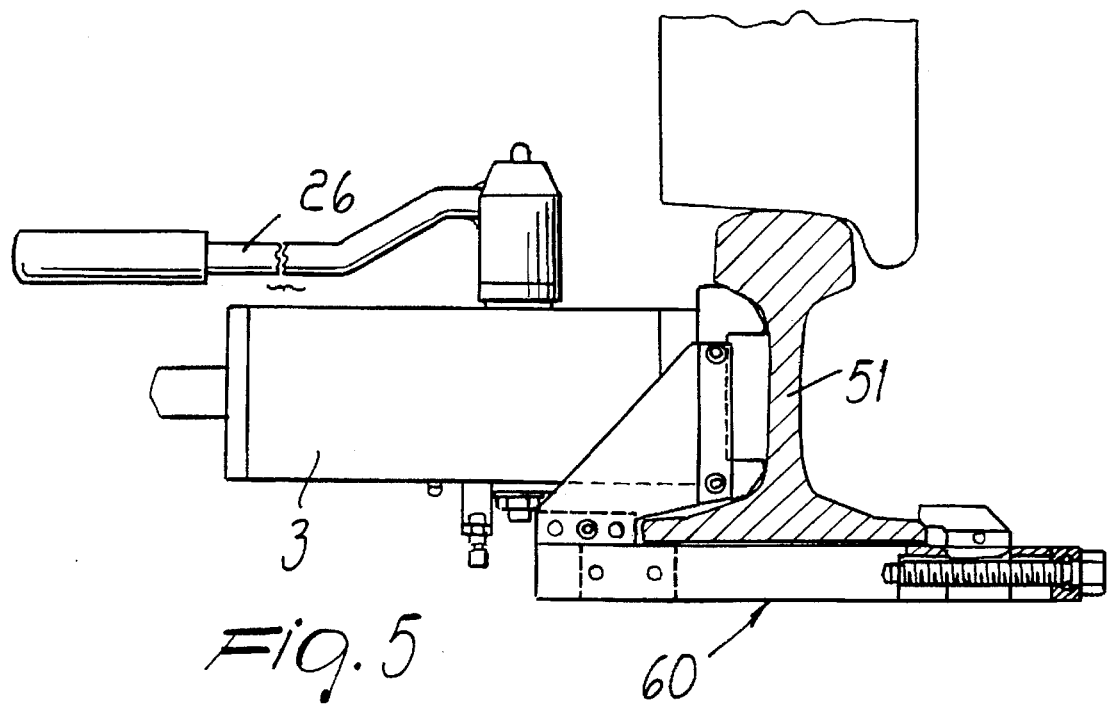
FIG. 5 is a schematic view of the drill applied to the flange of the rail and positioned outside its profile.

With reference to the above figures, the drill for drilling rails and track rigs, in railroad applications, according to the invention, which is generally designated by the reference numeral 1 for the electric-motor version and by the reference numeral 2 for the internal-combustion engine version, comprises a body 3 which is substantially L-shaped and is advantageously made of aluminum alloys.

The body 3 has a first wing 4 which delimits, at its free end, a flange 5 for the coupling of an electric motor 6 or a different flange 7 for the coupling of an internal-combustion engine designated by the reference numeral 8.

The motor 6 and the engine 8 are located above the second wing 9 of the body 3, so that the drill assembly assumes a substantially U-shaped configuration in which the output shaft, designated by 10 both for the electric motor and for the internal-combustion engine, is arranged parallel to, and spaced from, the tool's working axis.

The actuation motor or engine is connected to the tool, generally designated by the reference numeral 11, by means of the interposition of a reduction unit 12 which is advantageously constituted by a train of gears which are directly supported by the body 3.

The version driven by an internal-combustion engine is characterized in that the shaft of said engine is connected to the reduction unit by means of an elastic coupling 15; the casing of the engine furthermore does not rest directly on the body of the drill but is coupled to it advantageously by interposing four vibration-damping bushes 16. These constructive solutions avoid the transmission of unwanted mechanical stresses from the engine to the body of the tool, such as for example the vibrations produced by the engine itself during operation.

An important particularity of the invention resides in the fact that there are means for the translatory motion of the tool with respect to the body, so that during the advancement of the tool, both the body and the motor or engine remain in a fixed position and therefore only very small masses move. Said translatory motion means comprise a sleeve 20 which is internally grooved and is connected to the last gear of the reduction unit chain so that it is rotated by actuating the motor 6 or engine 8.

Inside the grooved sleeve 20 there is a grooved hollow shaft 21 which is rotationally coupled thereto and can slide with respect to it, along a longitudinal axis T of the tool, to an advanced drilling position. The shaft 21 is rotatably supported by a slider 22 which has, on its surface, a rack portion 24 meshing with a gear 25 connected to a feed lever 26.

The actuation of the lever 26 causes the translatory motion of the slider 22 and of the grooved shaft which is supported by it and rotated by the grooved sleeve 20.

The grooved shaft 21 is provided, at its working end, with a spindle 27 for clamping the tool, which can be constituted by a milling cutter or by a helical drill provided with a cooling channel which is connected in a per se known manner to a refrigeration system controlled by a ball 30.

Another important aspect is the fact that inside an axial duct 100 the grooved shaft 21 there is a fixed abutment rod 40 which is connected to the body at its inner end and has its free end arranged proximate to the ball 30. The abutment rod 40 acts as a scrap expelling device allows to eject the drilling scrap; when the drilling tool is constituted by a milling cutter, ejection is performed automatically during the backoff step, since as the tool backs off the carrot is expelled automatically.

Figure 11:
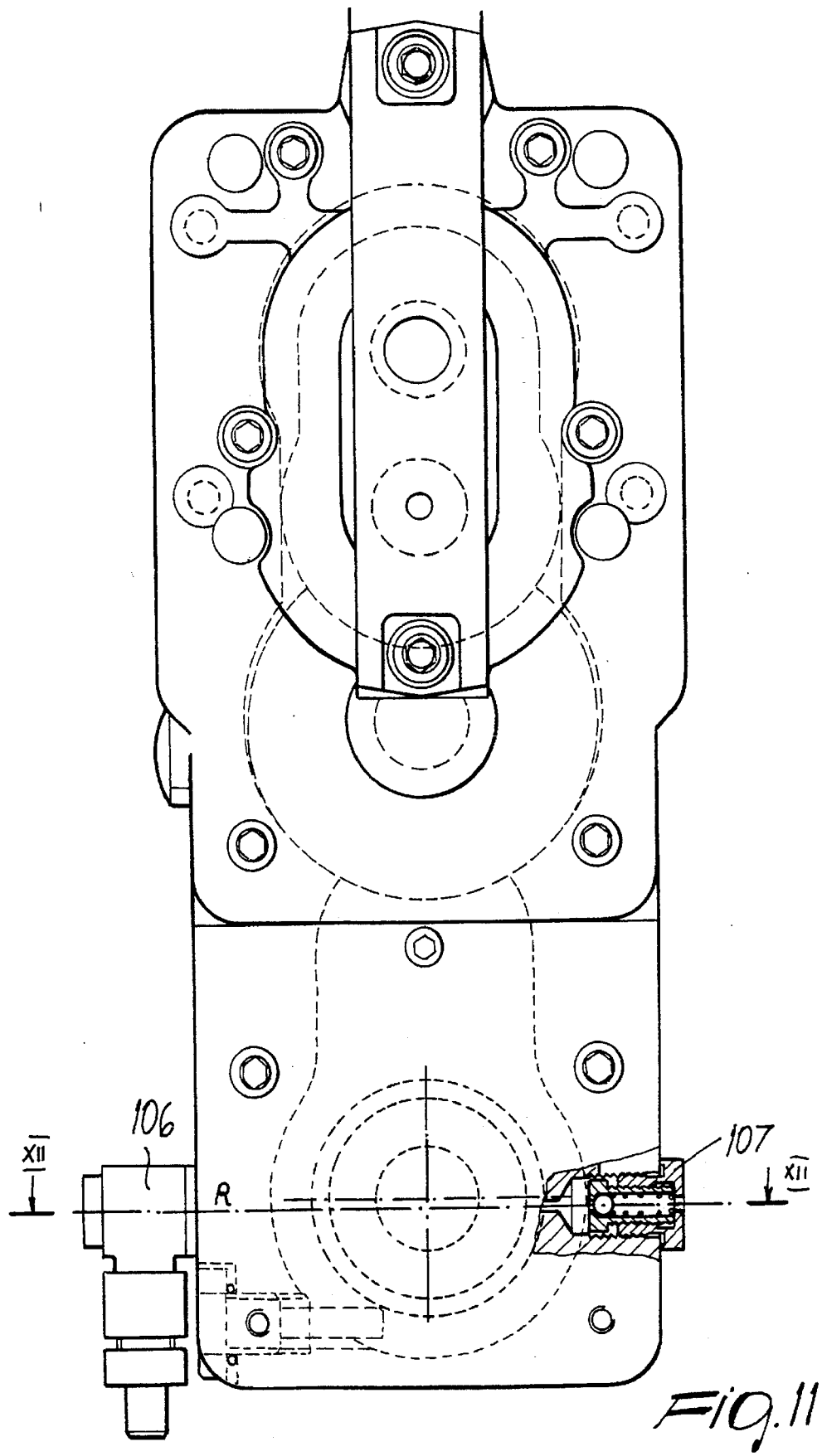
FIG. 11, is a rear view of the drill showing the position of the feeding coupling for the cooling fluid and of the pressure relief valve with respect to the axis of the spindle.
Figure 12:
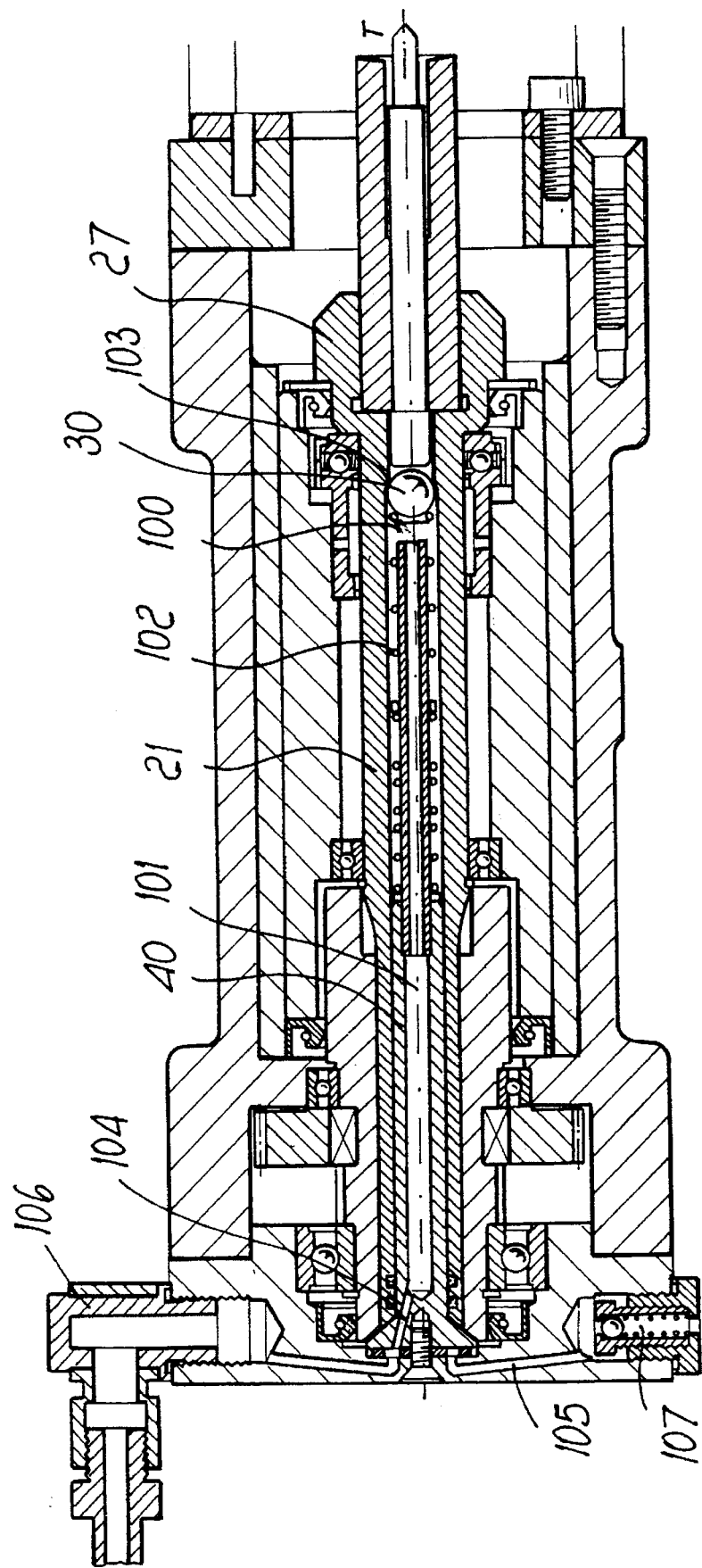
FIG. 12, is a sectional view taken along the plane XII—XII of FIG. 11, with the cooling fluid coupling rotated in the cross-section plane.

The refrigeration system, shown in FIG. 12, comprises a cylindrical hole 101 extending axially inside the rod 40 and opening into the duct 100 with which is thus in fluid communication. The ball 30 is axially movable inside the duct 100, being urged by a spring 102 in abutment against a shoulder portion 103 located in the proximity of the supporting spindle 27, so as to sealingly close the passage of the fluid towards the tool. Backward movement of the ball 30, away from the shoulder portion 103, caused by the tool 11 allows flowing of the cooling-lubricating fluid towards the cooling channel of the drilling tool. At the fixed end of the rod 40, the hole 101 communicates through channels 104 and 105 with a fluid coupling 106 and respectively with a pressure relief valve 107. The coupling 106 is threadedly inserted in the body 3 and feeds cooling-lubricating fluid to the refrigeration system. The relief valve 107 is of a known type provided with a closing ball urged by a spring calibrated so as to allow ejection of fluid when the pressure inside the refrigeration system may exceed a critical value, as, for example, when the lever 26 is actuated to withdraw the slider 22. In a preferred embodiment adopted for technological convenience, the coupling 106 and the valve 107, as shown in FIG. 11, are located on the body 3 of the drill laterally, in symmetrical opposition to each other and on the same axis R crossing the drill body in a position underneath the axis T of the tool. It is however stressed, that important for the optimum functioning of the drill according to the present invention, is the positioning of the fluid coupling 106 at the lowest possible point of the refrigeration system. Indeed, in this case, by simply removing the coupling from its threaded seat in the body 3, the fluid inside the refrigeration system will flow off by the effect of mere gravity. This is highly advantageous since allows keeping of the drill under severe ambient conditions, being only necessary, when the work is concluded, to disconnect the fluid coupling and allow draining of the cooling-lubricating fluid and protect thus the machine from possible damages due to freezing of the fluid inside the refrigeration system.

At the free end of the second wing 9 of the body 3 it is possible to provide fixing means comprising various jigs for fixing the body 3 at the element to be drilled.

With reference for example to FIG. 3, there is a jig, designated by the reference numeral 50, which engages the web 51 of the rail; a bridge-like lever system 52 which passes above the rail then fixes an abutment 53 on the other edge of the web.

When it is necessary to mount the drill outside the profile, there is a system, designated by the reference numeral 60, for locking to the flange of the rail; by engaging below said foot, said system allows to arrange the drill so that the body 3 lies on a horizontal plane, so that it is possible to keep the drill connected to the rails even when trains pass.

Figure 6:
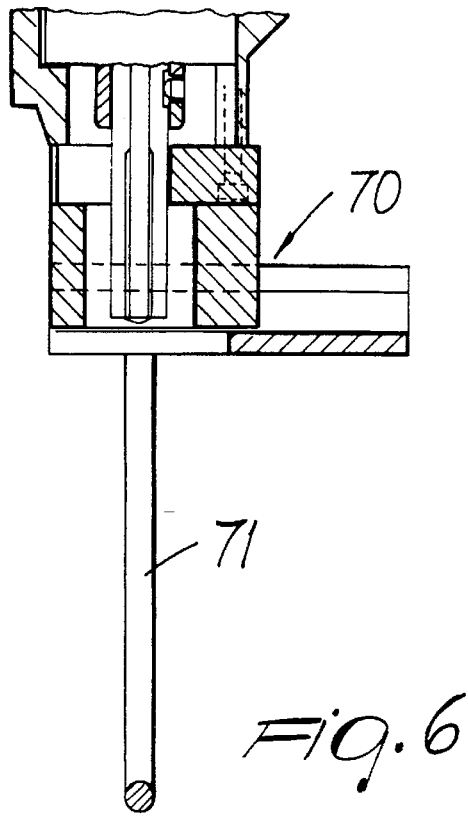
FIGS. 6 and 7 are sectional views, taken along two perpendicular planes, of a jig for the positioning and fixing of the drill to drill the slabs that support the boxes for the electric actuation of rail switches.
Figure 7:
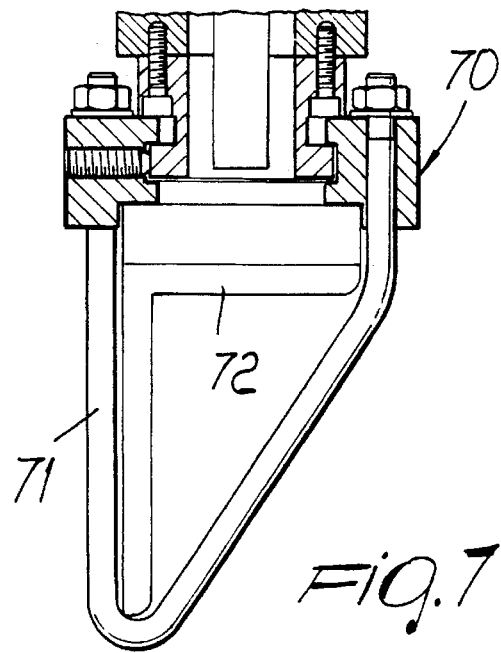

To perform vertical drillings, FIGS. 6 and 7 illustrate a jig 70 equipped with a triangular bracket 71 for fixing to the profiles 72 which are located at the slabs that support the boxes for the electric actuation of rail switches.

Another characteristic of the invention is the fact that the actuation lever 26 of the translatory motion means is equipped with initial stroke positioning means which are more clearly illustrated in FIGS. 8 to 10.

Said means, generally designated by the reference numeral 80, comprise a cap 81 fixed to the end of the actuation lever 26 and rotatably coupled around a tang 82 which is axially aligned with, and rigidly coupled to, the shaft 83 of the gear 25.

The cap 81 and the tang 82 are mutually coupled by means of a polygonal bar portion 85 which is accommodated in a polygonal seat 86 formed by the tang and can engage in a polygonal cavity 87 formed by the cap in order to rigidly rotationally couple them.

A stem 89 is connected to the polygonal bar 85 and ends with a button 90 protruding from the cap; a pusher spring 91 furthermore acts on the polygonal bar 85 and tends to move it into engagement with the cavity 87.

To perform angular positioning it is enough to apply pressure on the button 90, disengaging the polygonal bar from the polygonal cavity 87 and thus performing the required positioning of the lever 26, which is set by releasing the button 90, consequently causing the polygonal bar 85 to engage the polygonal cavity 87; this engagement rigidly rotationally couples the cap 81 to the tang 82.

For the sake of completeness, it should also be noted that a pin 95 is supported by the cap 81 and engages an annular groove 96 formed by the tang to prevent the axial disengagement of the cap with respect to the tang.

Therefore, during practical operation a drill is provided which is particularly compact in size by virtue of the fact that the motor or engine is arranged so that one of its axes is parallel to, and spaced from, the axis of the tool, so that the entire drill has overall dimensions that are considerably smaller than those of the known art.

Furthermore, since the moving masses are considerably limited, it is possible to use an aluminum alloy structure for the body which consequently has a very reduced weight.

The versatility of the drill is furthermore completed by the fact that the adopted configuration allows to apply to the body a plurality of jigs for coupling to the element to be drilled, so that said drill can be used for both horizontal and vertical drillings.

Furthermore, the presence of the means for the initial positioning of the lever allows to set the actuation lever always in the optimum position for the operator.

The invention thus conceived is susceptible to numerous modifications and variations, all of which are within the scope of the inventive concept.

All the details may furthermore be replaced with other technically equivalent elements.

In practice, the materials employed, as well as the contingent shapes and dimensions, may be any according to the requirements.

What is claimed is:

1. Drill for drilling rails and track rigs, in railroad applications, comprising:

a body;

a reduction unit supported by said body;

a motor for driving a drilling tool of said drill, said motor being supported on said body, and said reduction unit being interposed between said motor and said drilling tool;

translatory motion means for causing translatory motion of said drilling tool with respect to said body, said translatory motion means comprising a hollow shaft forming at an end thereof a supporting spindle for said tool, said shaft being movable to an advanced drilling position along a longitudinal axis of said tool and having a duct extending thereinto along said longitudinal axis up to said tool;

fixing means for removably fixing said body with respect to an element to be drilled; and a scrap expelling device for expelling drilling scrap, said expelling device comprising an abutment rod, said rod being fixedly supported at an end thereof at said body for extending in said duct inside said hollow shaft with a further free end thereof being arranged proximate to said supporting spindle, said free end of said rod expelling the drilling scrap upon a return movement of said shaft from said advanced position.

2. Drill according to claim 1, wherein said motor has an output shaft which is substantially parallel to, and spaced from, an axis of said tool.

3. Drill according to claim 2, wherein said motor is an internal-combustion engine, said output shaft being connected to said reduction unit through an elastic coupling, and vibration-damping bushes being interposed between said engine and said body.

4. Drill according to claim 1, wherein said body is substantially L-shaped and comprises a first wing that forms a flange for coupling to said motor and a second wing for accommodating said tool, said second wing being substantially perpendicular to said first wing.

5. Drill according to claim 1, wherein said translatory motion means further comprises a sleeve which is internally grooved, kinematically connected to said reduction unit, and slidingly coupleable to said hollow grooved shaft which forms a supporting spindle for said tool.

6. Drill according to claim 5, further comprising a slider which is slidingly coupled to said body and rotatably supports said grooved shaft, said slider having, on its surface, a rack segment, a gear being further provided for meshing with said rack segment, said gear being connected to an actuation lever, said lever actuating said gear for causing translatory motion of said shaft and said slider to an advanced drilling position.

7. Drill according to claim 4, wherein said means for removably fixing said body with respect to the element to be drilled are constituted by interchangeable jigs which are removably coupleable to a free end of said second wing of said body.

8. Drill according to claim 6, further comprising means for an initial positioning of said actuation lever.

9. Drill according to claim 8, wherein said initial positioning means comprises a cap which is fixed to an end of said actuation lever, said cap being rotatably coupleable around a tang, said tang being axially aligned with, and fixedly coupled to a driving shaft of said gear which meshes with said slider, a polygonal bar segment being furthermore provided which is accommodated in a polygonal seat formed by said tang, said bar being removably engageable in a polygonal cavity formed by said cap for jointly rotationally coupling said cap to said tang, a stem being connected to said bar, said stem ending with a button that protrudes from said cap, said polygonal bar segment being removably disengageable from said polygonal cavity for an initial positioning of said actuation lever.

10. Drill for drilling rails and track rigs, in railroad applications, comprising:

a body comprising a first wing and a second wing;

a reduction unit supported by said body;

a motor for driving a drilling tool of said drill, said motor being supported on said first wing of said body, and said reduction unit being interposed between said motor and said drilling tool;

translatory motion means for causing translatory motion of said drilling tool with respect to said body; and fixing means for removably fixing said body with respect to an element to be drilled; wherein said means for removably fixing said body with respect to the element to be drilled comprises interchangeable jigs, said jigs being removably coupled to a free end of said second wing of said body.

11. Drill according to claim 10, wherein said motor has an output shaft which is substantially parallel to, and spaced from an axis of said tool.

12. Drill according to claim 10, wherein said motor is an internal-combustion engine, said output shaft being connected to said reduction unit through an elastic coupling, and vibration-damping bushes being interposed between said engine and said body.

13. Drill according to claim 10, wherein said body is substantially L-shaped, said first wing forming a flange for coupling to said motor, and said second wing accommodating said tool, said second wing being substantially perpendicular to said first wing.

14. Drill according to claim 10, wherein said translatory motion means comprises a sleeve which is internally grooved, kinematically connected to said reduction unit, and slidingly coupleable to a hollow grooved shaft which forms a supporting spindle for said tool.

15. Drill according to claim 14, further comprising a slider which is slidingly coupled to said body and rotatably supports said grooved shaft, said slider having, on its surface, a rack segment, a gear being further provided for meshing with said rack segment, said gear being connected to an actuation lever, said lever actuating said gear for causing translatory motion of said shaft and said slider to an advanced drilling position.

16. Drill according to claim 15, further comprising an abutment rod which is fixedly supported by said body so as to extend inside said grooved shaft, a free end of said fixed abutment rod acting as a device for expelling drilling scrap upon a return of said slider from said advanced position.

17. Drill according to claim 15, further comprising means for an initial positioning of said actuation lever.

18. Drill according to claim 17, wherein said initial positioning means comprises a cap which is fixed to an end of said actuation lever, said cap being rotatably coupleable around a tang, said tang being axially aligned with, and fixedly coupled to a driving shaft of said gear which meshes with said slider, a polygonal bar segment being furthermore provided which is accommodated in a polygonal seat formed by said tang, said bar being removably engageable in a polygonal cavity formed by said cap for jointly rotationally coupling said cap to said tang, a stem being connected to said bar, said stem ending with a button that protrudes from said cap, said polygonal bar segment being removably disengageable from said polygonal cavity for an initial positioning of said actuation lever.

19. Drill for drilling rails and track rigs, in railroad applications, comprising:
 a body comprising a first wing and a second wing;
 a reduction unit supported by said body;
 a motor for driving a drilling tool of said drill, said motor being supported on said first wing of said body, and said reduction unit being interposed between said motor and said drilling tool;
 translatory motion means for causing translatory motion of said drilling tool with respect to said body; and
 fixing means for removably fixing said body with respect to an element to be drilled;
 means for an initial positioning of said actuation lever; wherein
 said initial positioning means comprises a cap which is fixed to an end of said actuation lever, said cap being rotatably coupleable around a tang, said tang being axially aligned with, and fixedly coupled to a driving shaft of said gear which meshes with said slider, a polygonal bar segment being furthermore provided which is accommodated in a polygonal seat formed by said tang, said bar being removably engageable in a polygonal cavity formed by said cap for jointly rotationally coupling said cap to said tang, a stem being connected to said bar, said stem ending with a button that protrudes from said cap, said polygonal bar segment being removably disengageable from said polygonal cavity for an initial positioning of said actuation lever.

20. Drill according to claim 19, wherein said motor has an output shaft which is substantially parallel to, and spaced from, an axis of said tool.

21. Drill according to claim 19, wherein said motor is an internal-combustion engine, said output shaft being connected to said reduction unit through an elastic coupling, and vibration-damping bushes being interposed between said engine and said body.

22. Drill according to claim 19, wherein said body is substantially L-shaped, said first wing forming a flange for coupling to said motor, and said second wing accommodating said tool, said second wing being substantially perpendicular to said first wing.

23. Drill according to claim 19, wherein said translatory motion means comprises a sleeve which is internally grooved, kinematically connected to said reduction unit, and slidingly coupleable to a hollow grooved shaft which forms a supporting spindle for said tool.

24. Drill according to claim 23, further comprising a slider which is slidingly coupled to said body and rotatably supports said grooved shaft, said slider having, on its surface, a rack segment, a gear being further provided for meshing with said rack segment, said gear being connected to an actuation lever, said lever actuating said gear for causing translatory motion of said shaft and said slider to an advanced drilling position.

25. Drill according to claim 24, further comprising an abutment rod which is fixedly supported by said body so as to extend inside said grooved shaft, a free end of said fixed abutment rod acting as a device for expelling drilling scrap upon a return of said slider from said advanced position.

26. Drill according to claim 19, wherein said fixing means for removably fixing said body with respect to the element to be drilled are constituted by interchangeable jigs which are removably coupleable to a free end of said second wing of said body.

27. Drill for drilling rails and track rigs, in railroad applications, comprising:
 a body;
 a reduction unit supported by said body;
 a motor for driving a drilling tool of said drill, said motor being supported on said body, and said reduction unit being interposed between said motor and said drilling tool;
 fixing means for removably fixing said body with respect to an element to be drilled;
 translatory motion means for causing translatory motion of said drilling tool with respect to said body, said translatory motion means comprising a hollow shaft forming at an end thereof a supporting spindle for said tool, said shaft being movable to an advanced drilling position along a longitudinal axis of said tool; and
 a scrap expelling device for expelling drilling scrap, said expelling device comprising an abutment rod, said rod being fixedly supported at an end thereof at said body for extending inside said hollow shaft with a further free end thereof being arranged proximate to said supporting spindle;
 a refrigeration system for providing cooling-lubricating fluid to the drilling tool, said refrigeration system comprising a cylindrical hole extending inside said rod, a duct extending in said hollow shaft along said longitudinal axis up to said tool, said hole and said duct being in fluid communication, a fluid coupling and a pressure relief valve mounted in said body, said fluid coupling and said relief valve being in fluid communication with said hole and said duct for introducing and respectively letting off said fluid from said refrigeration system, said fluid coupling being located at a lowest point of said refrigeration system.

28. Drill according to claim 27, wherein said duct has a shoulder portion located in proximity of said end forming said spindle, a ball being urged in abutment against said shoulder portion for sealingly closing said duct, spring means being supported on said rod for urging said ball against said shoulder portion so as to selectively stop and allow flowing of the cooling-lubricating fluid to the tool.

29. Drill according to claim 27, wherein said fluid coupling and said relief valve are located on said body laterally, in symmetrical opposition to each other, and along a same axis, said axis crossing said body in a position underneath said longitudinal axis of said tool.

30. In a drill having a body and, inside said body, translatory motion means for causing translatory motion of said drilling tool with respect to said body, said translatory motion means including a hollow shaft forming at an end thereof a supporting spindle for said tool, said shaft being movable to an advanced drilling position along a longitudinal axis of said tool, a refrigeration system for providing cooling-lubricating fluid to the drilling tool, said refrigeration system comprising: a duct extending inside said hollow shaft along said longitudinal axis up to said tool, a fluid coupling and a pressure relief valve mounted in said body, said fluid coupling and said relief valve being in fluid communication with said duct for introducing and respectively letting off said fluid from said refrigeration system, said fluid coupling being located at a lowest point of said refrigeration system.

31. A refrigeration system according to claim 30, wherein said duct has a shoulder portion located in proximity of said end forming said spindle, a ball being urged in abutment against said shoulder portion for sealingly closing said duct, spring means being further provided inside said shaft for urging said ball along said duct and against said shoulder portion so as to selectively stop and allow flowing of the cooling-lubricating fluid to the tool.

32. A refrigeration system according to claim 30, wherein said fluid coupling and said relief valve are located on said body laterally, in symmetrical opposition to each other, and along a same axis, said axis crossing said body in a position underneath said longitudinal axis of said tool.

* * * * *